United States Patent [19]

Biensan et al.

[11] 4,067,861

[45] Jan. 10, 1978

[54] ANIONIC POLYMERIZATION OF LACTAMS IN AN EXTRUDER WITH CONTROLLED OUTPUT RATE

[75] Inventors: Michel Biensan; Philippe Potin, both of Billiere, France

[73] Assignee: Ato Chimie, Courbevoie, France

[21] Appl. No.: 627,948

[22] Filed: Nov. 3, 1975

[30] Foreign Application Priority Data

Nov. 12, 1974 France ............................... 74.37242

[51] Int. Cl.² ............................................. C08G 69/18
[52] U.S. Cl. ................................ 260/78 L; 264/40.1; 264/176 F
[58] Field of Search ...................... 260/78 L

[56] References Cited

U.S. PATENT DOCUMENTS

| | | | |
|---|---|---|---|
| 3,200,095 | 8/1965 | Wichterle et al. | 260/78 L |
| 3,376,369 | 4/1968 | Fisher | 260/78 L |
| 3,484,414 | 12/1969 | Joris et al. | 260/78 L |
| 3,676,544 | 7/1972 | Reinking et al. | 260/78 L |

*Primary Examiner*—Harold D. Anderson
*Attorney, Agent, or Firm*—Burgess, Ryan and Wayne

[57] ABSTRACT

Anionic polymerization of lactams is carried out in an extruder into which at least one lactam, at least one catalyst and at least one activating agent are introduced and wherein the mixture of said substances is polymerized prior to being extruded through an extrusion die. The output rate of the polymerized substance is controlled by transfer means, such as a metering pump, arranged between the outlet of the body of the extruder and the extrusion die.

4 Claims, 1 Drawing Figure

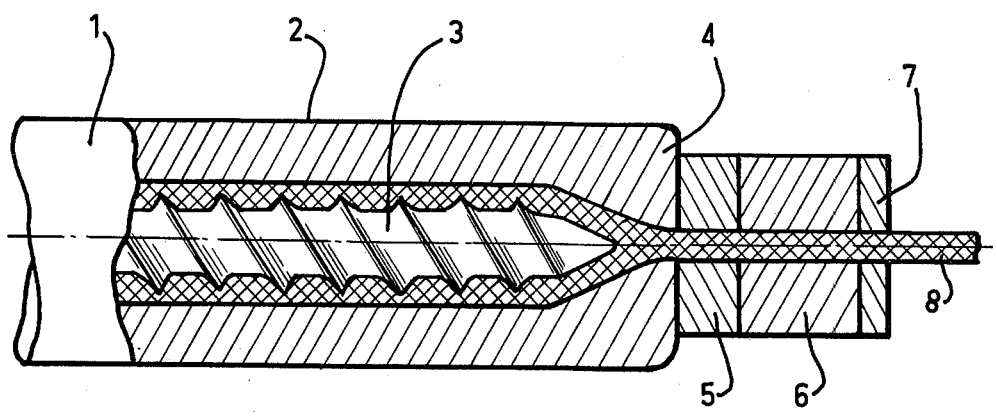

ANIONIC POLYMERIZATION OF LACTAMS IN AN EXTRUDER WITH CONTROLLED OUTPUT RATE

The present invention is related to a method of anionic polymerization of lactams in an extruder, and it is also related to a device for carrying out the said method.

In the known methods for anionic polymerization of lactams in an extruder the mixture to be polymerized, e.g. lactam-12 mixed with a catalyst and a promotor or activator, is introduced into the extruder, stirred therein in a stirring section, heated to the polymerization temperature and finally extruded through an extruding die.

It is known that when applying such method of production it is very difficult to obtain a product which presents the desirable homogeneity in time, i.e. to maintain the various parameters which determine the extrusion output rate at stable values.

Indeed a minor perturbation of the extrusion output rate will have an immediate influence on the temperature profile and will thus result in a considerable variation of the polymerization process and consequently in a variation of the output rate and the quality of the final product.

For instance, an increase of 2% of the output rate results in a decrease of 10 to 15% of the polymerization velocity, and consequently in a considerable variation of the quality of the final product.

The present invention is aimed at providing a method which overcomes the above described drawbacks, and at providing a device for carrying out the said method, the above-mentioned method and device according to the invention being adapted to allow of producing granules or, if desired, of directly producing semi-finished products such as wires, sheeths or profiled sections, due to the perfectly controlled output rate obtained by the invention.

It is one object of the invention to provide a method of anionic polymerization of lactams in an extruder, wherein a mixture comprising at least one lactam, at least one catalyst and at least one activator is introduced into the extruder, said mixture being polymerized within the body of the extruder prior to being extruded through an extrusion die, and the output rate of the thus polymerized substance being controlled between the outlet of said extruder body and said extrusion die.

It has been observed that in practice this control allows of considerably improving the operating conditions of the extruder and more particularly of simplifying the operation of the installation.

The method according to the present invention is particularly adapted to be used for the polymerization of lactams having at least six carbon atoms, and preferably for the polymerization of lactams having 6 to 12 carbon atoms, especially caprolactam, oenantholactam and dodecalactam, which lactams may be used alone or in combination.

The catalysts and activators which are admixed to the lactam so as to constitute the reaction mixture may be selected from the group of known catalysts and activating agents conventionally used in the process of anionic polymerization of lactams. As far as the catalysts are concerned, alkali metals such as sodium and potassium, alkali metal hydrides and hydroxides may be cited, and as far as the activators are concerned, the organic isocyanates, the ureas, the amides and the acid chlorides may be cited.

The polymerization temperatures are substantially equal to those used in the known methods. These temperatures are comprised between the melting point of the polylactam or copolylactam and the temperature starting from which a degradation of the polymer takes place, the said last temperature being in the most cases on the order of 300° C.

The device for carrying out the method described herein-above, comprises an extruder in which the polymerization of the lactam is effected and a die for extruding the polymerized substance, said device further comprising transfer means arranged between the outlet of the extruder body and the extrusion die and adapted to receive the polymerized substance issuing from said extruder and to transfer said polymerized substance at a constant output rate to said extrusion die.

In one embodiment of the invention, the instant device comprises transfer means constituted by a metering pump associated to velocity control means, said pump being preferably constituted by a gear pump which is driven at a constant speed.

The invention will be described hereinafter with reference to the appended drawing which shows schematically one embodiment of the device according to the invention, by way of illustration but not of limitation.

As shown in the appended drawing, the device according to the invention comprises an extruder or mixer 1 the body 2 of which is represented in the drawing; said extruder comprises a screw 3, and a metering pump 6 adapted to feed an extrusion die 7 is mounted onto the outlet 4 of extruder body 2 by means of a connecting piece 5.

The extruder 1 is fed in a conventional manner with a mixture containing a lactam, a catalyst and an activator. This mixture is heated to its polymerization temperature, and the resulting polymerized substance reaching the outlet 4 of the extruder body is taken up by pump 6 and extruded through die 7 in the form of a rod or profiled section 8.

Pump 6 may be a gear pump and is associated to velocity control means, i.e. to output rate control means, which may be constituted by a so-called "motovariation" group (not shown).

This pump is adapted to ensure a constant flow of polymerized substance through the extrusion die. The motor which drives the pump must have a power sufficient for substantially preventing any influence of possible variations of the viscosity of the polymerized substance on the output rate.

The presence of the output rate control member, for instance of the pump schematically indicated in the appended drawing, furthermore allows of a considerable increase of the pressure upstream of the die plate. On account of this fact, in association with a constant output rate it is possible to produce directly profiled sections, which is not possible when a simple polymerization extruder is used.

The starting and the control of the device according to the invention are considerably simplified. The speed of the screw of the extruder has practically no influence on the output rate; thus it is possible to increase this speed within large limits so as to obtain a better homogeneity, especially when various filler materials or plastifiers are to be added.

EXAMPLE

When carrying out a test wherein a device corresponding to the one illustrated on the appended drawing was used, the mixture to be polymerized comprised lactam-12, 0.65 mol.-% sodium hydride and 0.65 mol.-% activator. The pump was operated so as to produce a normal output of about 35 kg/h, and the polymerization temperature was about 250° C.

A pump of the type TAVANNES MACHINES CO. having an output of 20 ml per revolution and speed controlled by means of a "moto-variator" group was used.

The test was continued for 24 hours with successive loads of 200 kg; substantially only the first ½ hour of operation produced a substance which was not in conformity with the official standards. During the remainder of the test the adjustment of the pump was not modified; the pressure upstream of said pump was at least 50 kg/sq.cm.

Thus, the average inherent viscosity being 1.45, with a tolerance on the order of 0.02 during the test using a pump, said viscosity varied from 1.40 to 1.55 during a test without a pump. Likewise, the rate of polydodecalactam monomer (as determined by sublimation at 230° C under vacuum of 1 Torr) during said test using a pump was 0.28 with a tolerance on the order of 0.08, as compared to a value comprised between 0.1 and 0.7 obtained during the test without using a pump.

The flowability of the polydodecalactam during the test using a pump was 2,150 with a variation on the order of 275, as compared to the flowability of 870 to 2,800 obtained in a test carried out without using a pump. The flowability of a substance is defined by the weight of flowing substance per unit of time -particularly the number of mg per minute- which flows under the effect of a pressure of 2 kg/cm$^2$ through a die having a diameter of 3 mm, at a temperature of 240° C.

During the test using a pump, the variations of the ouptut rate were particularly small; the average value of the output was 34.7 kg/h with a tolerance on the order of 0.8% (relative value), whereas the corresponding relative tolerance value obtained in a test without using a pump was about 2.5%.

It has been noted that the quality of the polymer obtained in the installation according to the invention was satisfactory practically from the moment the operation of the installation was started when granules were produced, and that said quality was satisfactory after about half and hour from the start of the operation, when profiled sections were produced.

It must be noted particularly that the regular output provides for satisfactory reproducibility, in regard to the properties of the products obtained.

The anionic polymerization of lactams in an extruder, as defined by the present invention, allows on the one hand for obtaining stability of the polymer flow at the die inlet and consequently an excellent homogeneity of the extruded product, and allows on the other hand, if desired, for increasing the pressure upstream of the extrusion die, or of intensifying the agitation of the reaction mixture by conveniently controlling the velocity of the screw or screws of the mixing extruder without increasing the output rates of the extruded product, whereby the homogeneity of the said product and consequently its mechanical properties are further improved.

The invention is not limited to the embodiment described hereinabove and shown in the drawing; this embodiment may be varied in many ways without leaving the scope of the invention, especially as claimed in the appended claims.

What is claimed is:

1. In a method for the anionic polymerization of lactams in an extruder wherein at least one lactam having 6 to 12 carbon atoms in the lactam ring, at least one catalyst and at least one activator are introduced into the extruder and wherein a polymer is formed in said extruder and said polymer is extruded through an extrusion die, the improvement which comprises passing the polymer through a flow control zone interposed between the extruder and the extrusion die wherein the flow of the polymer from the extruder to the extrusion die is controlled at a substantially constant rate.

2. The method claimed in claim 1, wherein said lactam is one having at least six carbon atoms.

3. The method claimed in claim 1, wherein said lactam is one having 6 to 12 carbon atoms.

4. In a method, according to claim 1, for anionic polymerization of lactams by extrusion wherein a mixture of at least one lactam, at least one catalyst and at least one activator is polymerized in said extruder, the improvement comprising feeding the resulting polymer at a rate of about 35 kg/h between the outlet of said extruder and said extrusion die.

* * * * *

UNITED STATES PATENT OFFICE
CERTIFICATE OF CORRECTION

Patent No. 4,067,861  Dated January 10, 1978

Inventor(s) Michel Biensan, et al

It is certified that error appears in the above-identified patent and that said Letters Patent are hereby corrected as shown below:

Column 2, line 59: After "rate" insert a comma.

Column 4, line 2: "half and hour" should be --half an hour--.

Signed and Sealed this

Twenty-fifth Day of July 1978

[SEAL]

Attest:

RUTH C. MASON
Attesting Officer

DONALD W. BANNER
Commissioner of Patents and Trademarks